US 6,431,058 B1

(12) United States Patent
Binot et al.

(10) Patent No.: US 6,431,058 B1
(45) Date of Patent: Aug. 13, 2002

(54) ELECTRIC KETTLE WITH METAL HEALING PLATE

(75) Inventors: Jean-Pierre Binot, St. Ouen de Minbre; Michel Girault, Conde sur Sarthe; Guy Labelle, Champfleur, all of (FR)

(73) Assignee: Moulinex S.A., Cormelles le Royal (FR)

( * ) Notice: Subject to any disclaimer, the term of this patent is extended or adjusted under 35 U.S.C. 154(b) by 0 days.

(21) Appl. No.: 09/913,941

(22) PCT Filed: Feb. 11, 2000

(86) PCT No.: PCT/FR00/00351

§ 371 (c)(1),
(2), (4) Date: Dec. 7, 2001

(87) PCT Pub. No.: WO00/48494

PCT Pub. Date: Aug. 24, 2000

(30) Foreign Application Priority Data

Feb. 18, 1999 (FR) .............................................. 99 02046

(51) Int. Cl.[7] ............................ A23L 1/00; A47J 27/21; H05B 3/02; H05B 3/82
(52) U.S. Cl. .......................... 99/331; 99/281; 219/438; 219/439
(58) Field of Search ........................... 99/327–332, 403, 99/337, 279–282, 323.3; 219/385–387, 429, 433, 435–439, 441, 401, 442; 392/447, 498

(56) References Cited

U.S. PATENT DOCUMENTS

| 3,784,788 A | * | 1/1974 | Fourny ........................ 219/441 |
| 3,828,164 A | * | 8/1974 | Fischer et al. .......... 219/433 X |
| 4,017,277 A | * | 4/1977 | Van Dyke, Sr. et al. .. 99/331 X |
| 4,539,468 A | * | 9/1985 | Phillips et al. ............... 392/447 |
| 4,752,671 A | * | 6/1988 | Foster et al. ............ 219/439 X |
| 4,754,122 A | * | 6/1988 | Coppier ...................... 219/437 |
| 4,829,888 A | * | 5/1989 | Webste et al. ............ 99/281 X |
| 5,125,068 A | * | 6/1992 | NcNair et al. ............. 99/331 X |
| 5,378,482 A | * | 1/1995 | Kersten et al. .............. 426/231 |
| 5,410,129 A | * | 4/1995 | Kersten et al. ................. 99/331 |
| 5,522,307 A | * | 6/1996 | Kersten et al. ................. 99/331 |
| 5,557,704 A | * | 9/1996 | Dennis et al. .......... 219/438 X |
| 5,635,092 A | * | 6/1997 | O'Neil ........................ 219/441 |

* cited by examiner

Primary Examiner—Timothy F. Simone
(74) Attorney, Agent, or Firm—Young & Thompson

(57) ABSTRACT

An electric kettle includes a tubular body (1), heating elements comprising an electric resistor (6) associated with a heating plate (8) mounted in the body lower part, defining with the side wall (3) of the body (1) a reservoir (10) of liquid to be heated and in direct contact by its upper surface with the liquid, and elements supporting a peripheral rim (8a) of the heating plate (8). The support elements comprise a vertical skirt (20) extending inside the body (1) and fixed on the inner surface (3a) of the body side wall (3) by first reversible fixing elements (28, 30), and the body (1) has a base formed by a lid (24) fixed on the skirt (20) with second reversible fixing elements (32, 37).

10 Claims, 2 Drawing Sheets

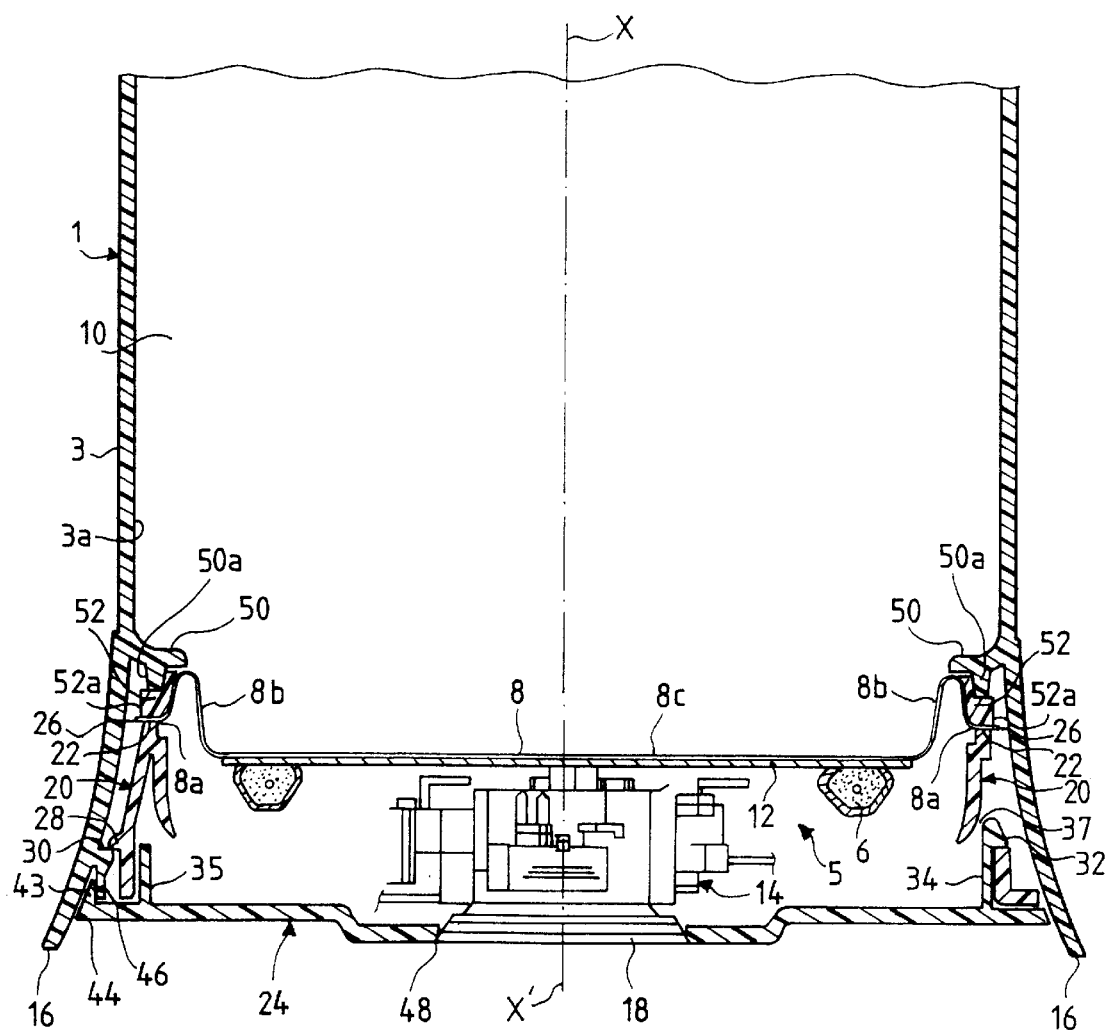
FIG_1

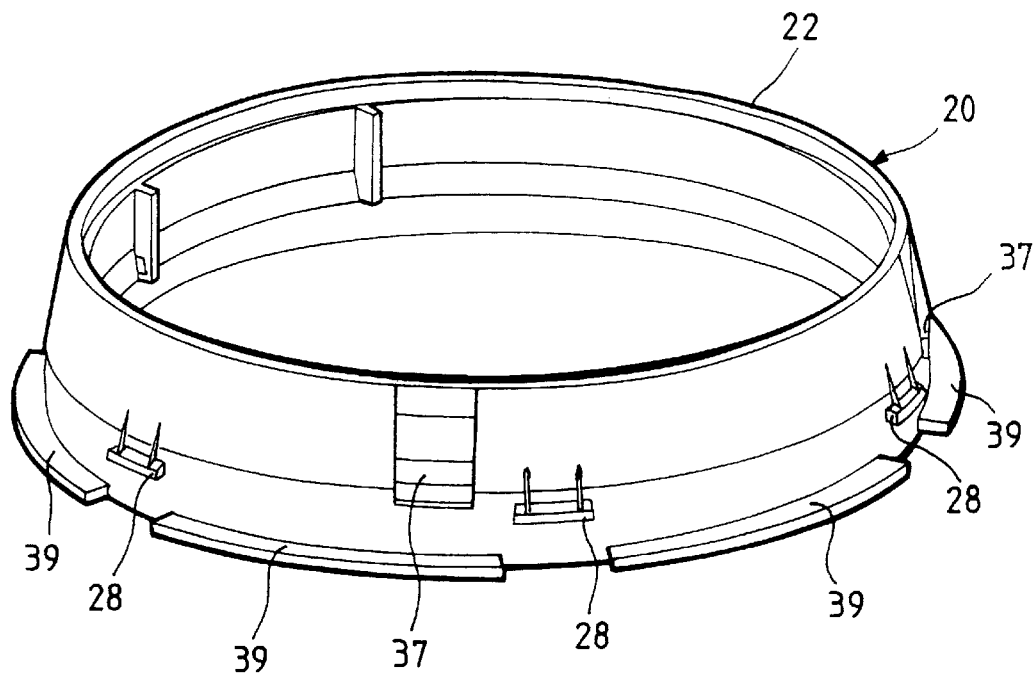
FIG_2
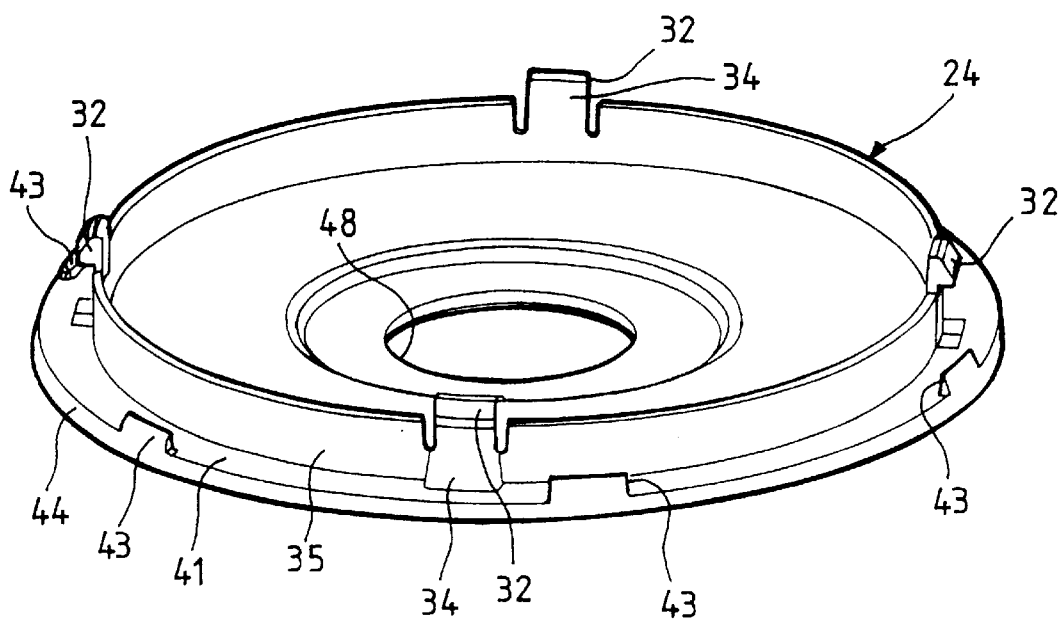
FIG_3

ELECTRIC KETTLE WITH METAL HEATING PLATE

The present invention relates to an electric kettle comprising a tubular body having a side wall, heating means comprising at least one electrical resistance associated with a metal heating plate mounted in sealed relation in the lower portion of the body and delimiting with the side wall of the body a reservoir for the liquid to be heated. Said heating plate being in direct contact, by its upper face, with the liquid to be heated, and support means adapted to support a peripheral rim of the heating plate.

In a known electric kettle of this type, with a so-called hidden resistance, the peripheral rim of the heating plate is supported by abutments projecting on the internal surface of the side wall of the body of the kettle; the heating plate is maintained in place by means of a gripping member shaped as a face with a transverse section of U shape whose base constitutes the bottom of the body of the kettle and whose two lateral wings are clasped resiliently about the side wall of the body so as to retain the latter compressed about the heating plate. This assembly of the heating plate has the advantage of being able to be dismounted from the external base of the body of the kettle to give easy access to the heating plate to withdraw it for repair.

Moreover, in such a kettle, the heating plate is associated by its lower face, not only with the electrical resistance, but also with electrical members for regulation and safety which are the object of electric cable during the production of the kettle or after repair of the heating plate, this cable as well as the provision of electrical connections with the resistance taking place manually after mounting of the heating plate in the body of the kettle.

In the case of the known kettle described above, the electric cabling operation as well as the regulating and safety members of the heating plate as well as the heating resistance, is carried out inverted and without the external base, to permit access to the heating plate. However, in the absence of the external base, the heating plate risks no longer being correctly held in place in the body of the kettle and hence to take an unstable position, which renders difficult and painstaking the operation of electrical cabling.

The invention has particularly for its object to overcome these drawbacks and to provide an electric kettle of the type described above, in which the securement of the heating plate is simple to carry out, reliable, easily disassembleable for access to the heating plate to repair, and permits in the course of production of the kettle or after repair of the heating plate, an easy operation of cabling the different electrical members associated with the heating plate.

According to the invention, the support means comprise a piece forming a skirt which extends vertically within the body, between the peripheral rim of the plate and the lower peripheral edge of the body, supporting with its upper peripheral edge the lower surface of the peripheral rim of the heating plate, and which is fixed on the internal surface of the side wall of the body by first reversible securement means, and the body of the kettle comprises a bottom constituted by a closure cover which is fixed on the piece forming a skirt by a second reversible securement means.

Thus, the heating plate is maintained in place on the piece forming an internal skirt, which is fixed on the internal surface of the side wall of the body of the kettle and which is then closed at its base by securement of the cover forming the bottom itself of the body of the kettle, thus leading to a rapid and reliable mounting of the heating plate in the kettle. Moreover, it will be understood that in the case of acting on the heating plate to repair it, it suffices to remove first the cover and then the piece forming a skirt to have access to and to remove the heating plate, and that in the course of production of the kettle or after repair of the plate, the body being returned and the cover unmounted, the heating plate remains perfectly held in place in the body thanks to the securement of the piece forming an internal skirt on the internal surface of the side wall of the body, thereby facilitating cabling of the various electrical members associated with the heating plate.

The characteristics and advantages of the invention will become further apparent from the description which follows, by way of non-limiting example, in reference to the accompanying drawings, in which:

FIG. 1 is a fragmentary vertical cross-sectional view of a kettle according to the invention;

FIG. 2 is a perspective view, on an enlarged scale, of a member forming a skirt of the kettle of FIG. 1; and FIG. 3 is a perspective view, on an enlarged scale, of a closure plate of the kettle of FIG. 1.

In the embodiment shown in FIG. 1, the electric kettle comprises a tubular body 1 of plastic material, of slightly flared shape in its lower portion, comprising a side wall 3 and having a vertical axis of symmetry XX'.

In the lower portion of the body 1 are mounted electrical heating means, designated by the general reference numeral 5 in FIG. 1, comprising at least one electrical resistance 6 associated with the metal heating plate 8 mounted in sealed fashion in the body 1. The heating plate 8 delimits with the side wall 3 of the body 1 a reservoir 10 for the liquid to be heated, closed at its upper portion by a cover (not shown), and coming into direct contact by its lower surface with the liquid to be heated.

The electrical resistance 6 is sheathed resistance associated with the metal heating plate 8 by means of a thermal diffusion plate 12, but can also be in the form of a seriographic resistance without thereby departing from the scope of the invention.

This electrical resistance 6 is adapted to produce a high heating power, of the order of 3000 watts.

The heating plate 8 is also associated with regulation and safety members, indicated at 14 in FIG. 1, which are disposed in the space located between the heating plate 8 and the lower peripheral edge 16 of the body 1; these regulation and safety members 14 of the heating plate 8 are electrically connected to a connector 18, for example of the female type, axially located on the vertical axis XX' of the body 1 of the kettle, opening into the base of the body 1 and adapted to be engaged in a male connector provided in a base (not shown) on which is adapted to come to rest the body 1 of the kettle.

According to the invention, an annular member forming a skirt 20 (seen in FIGS. 1 and 2), of plastic material, extends vertically within the body 1, in the space located between the heating plate 8 and the lower peripheral edge 16 of the body 1, and has an upper peripheral edge 22 adapted to support a peripheral rim 8a of the heating plate 8, and is fixed on the internal surface 3a of the side wall 3 of the body by first reversible or demountable securement means, whilst a cover or closure plate 24 (seen in FIGS. 1 and 3) of disc shape, of plastic material, constitutes the bottom itself of the body 1 of the kettle and is fixed on the member forming an internal skirt 20 by second reversible securement means.

As to FIG. 1, the peripheral rim of the heating plate 8 is constituted by a horizontal wing 8a resting on the upper peripheral edge 22 of the member forming an internal skirt 20, having a free end 26 located at a slight distance from the internal surface 3a of the side wall 3 of the body 1, and extending to a higher level than that of the heating plate 8.

This wing 8a is connected to the plate 8 by a second wing 8b forming a bend of transverse cross-section that is inverted U shaped which is slightly flared and whose base is rounded.

The plate 8 is thus shaped as a cup whose bottom is constituted by the upper surface 8c and the side wall is constituted by the two wings 8a, 8b, the bottom 8c of the cup being located at a level substantially below that of the wing 8a. This arrangement of the plate 8 has the advantage of considerably reducing the temperature gradient of the plate beyond its bottom 8c, thereby preventing any possible deformation of the plastic body 1 of the kettle. The body 1 can thus be made of a plastic material of limited thermal resistance, such as polypropylene, and hence at least cost.

Referring to FIGS. 1 and 2, the reversible securement means provided to secure the member forming an internal skirt 20 to the internal surface 3a of the side wall 3 of the body 1 of the kettle, comprise, in this embodiment, a plurality of resilient lugs 28, better seen in FIG. 2, disposed projecting about the external periphery of the member forming a skirt 20 and adapted for snap-in engagement, respectively, with a plurality of notches 30 provided in the internal surface 3a of the side wall 3 of the body 1 of the kettle, see FIG. 1.

The lugs 28 and the complementary notches 30 are spaced uniformly in a transverse plane of the body 1 of the kettle.

The mounting of the heating plate 8 is thus very simple to carry out, by simple snapping in of the member forming a skirt 20 on the internal surface of the side wall 3 of the body 1.

In this embodiment, with respect to FIGS. 1 and 3, the reversible securement means provided to secure the closure cover 24 to the member forming a skirt 20, comprise, themselves, a plurality of resilient hooks 32 oriented outwardly, better seen in FIG. 3, which are formed at the upper ends of the vertical tongues 34 made from an annular enclosure 35 surmounting internally the cover 24 (see FIG. 3), and which are adapted to be inserted snap-fittingly, respectively, into a plurality of recesses 37 provided in the member forming a skirt 20 by being angularly offset relative to the lugs 28 that they present, as seen in FIG. 2.

The hooks 32 and the complementary recesses 37 are themselves also distributed uniformly in a transverse plane of the body 1 of the kettle, but are angularly offset relative to the lugs 28 and the complementary notches 30.

Moreover, as seen in FIG. 2, the member forming a skirt 20 comprises, at the base of its external periphery, a plurality of radial ribs 39 each extending circumferentially between two lugs 28 and adapted to come to be applied flat against a peripheral annular edge 41 (FIG. 3), external to the partition 35, of the cover 24, during mounting of the latter on the member forming a skirt 20.

Preferably, as shown in FIG. 1, the cover 24 is also secured to the internal surface 3a of the side wall 3 of the body 1 by supplemental reversible securement means adapted to counter lock the member forming a skirt 20 during emplacement of the cover 24 so as to reinforce the holding in place of the heating plate 8 in the body 1.

In the embodiment shown in FIGS. 1 and 3, these supplemental securement means comprise a plurality of resilient vertical ribs 43 slightly oriented inwardly, better seen in FIG. 3, which are formed on the peripheral edge 44 of the cover 24 and are distributed uniformly thereabout and in an angular manner identical to that of the lugs 28 (FIG. 2) of the member forming a skirt 20, and which are adapted to be pressed by axial action, respectively, against a plurality of downwardly extending tongues 46 each formed from the complementary notch 30 (FIG. 1) provided on the internal surface 3a of the side wall 3 of the body 1 and adapted for the securement of the member forming a skirt 20.

The mounting of the cover 24 is thus very simple to carry out, by simple snapping in on the member forming the skirt 20 and, simultaneously, by an engagement with axial action on the internal surface of the side wall 3 which is thus retained compressed about the member forming the skirt 20.

The cover 24, FIG. 3, is moreover pierced with a central opening 48 into which opens the connector 18 (FIG. 1) during mounting of the cover.

In the embodiment shown in FIG. 1, the internal surface of the side wall 3 of the body 1 comprises a wing 50 extending horizontally inwardly of the reservoir 10 of the liquid to be heated by being disposed slightly above the wing 8b, shaped here as a bend of transverse cross-section of inverted U shape, of the heating plate 8, and having an edge 50a descending in line with the horizontal wing 8a of the plate 8.

A sealing joint 52, preferably molded of a flexible plastic material such as elastomer of the silicone type, is interposed between the edge 50a of the wing 50 and the folded wing 8b of the plate 8, and is provided with a peripheral rim 52a which is held gripped between said edge 50a and the horizontal wing 8a of the plate 8.

This assembly of the heating plate 8 with the help of the member forming an internal skirt 20 and of the cover 24, permits not only ensuring a solid securement of the heating plate 8 in the body 1 of the kettle, but also giving access for easy withdrawal, to the heating plate 8, by manual disassembly first of the cover 24, then of the member forming a skirt 20, in the case of acting on the plate to repair it.

Similarly, the cabling of the regulation and safety members 14 of the heating plate 8, as well as the provision of electrical connections with the electrical resistance 6, taking place not only in the course of production of the kettle but also after repair of the heating plate 8 and the return of the plate 8 to be mounted into the body 1, body 1 returned and cover 24 not mounted, are particularly facilitated to the extent to which the plate 8 remains in a perfectly stable position thanks to its securement by the member forming an internal skirt 20, itself locked against the internal surface of the side wall 3 of the body 1; after cabling the various electrical members associated with plate 8, the body 1 of the kettle is closed by simple snapping on of the cover 24.

We claim:

1. Electric kettle comprising a tubular body (1) comprising a side wall (3), heating means (5) comprising at least one electrical resistance (6) associated with a metal heating plate (8) mounted in sealed manner in the lower portion of the body (1) and delimiting with the side wall (3) of the body a reservoir (10) for the liquid to be heated, said heating plate (8) being in direct contact, by its upper surface, with the liquid to be heated, and support means to support a peripheral rim (8a) of the heating plate (8), characterized in that the support means comprise a member forming a skirt (20) which extends vertically within the body (1), between the peripheral rim (8a) of the plate (8) and the lower peripheral edge (16) of the body (1), supporting with its upper peripheral edge (22) the lower surface of the peripheral rim (8a) of the heating plate (8), and which is fixed on the internal surface (3a) of the side wall (3) of the body by first reversible securement means (28, 30), and in that the body (1) of the kettle comprises a base constituted by a closure cover (24) which is secured on the member forming a skirt (20) by a second reversible securement means (32, 37).

2. Electric kettle according to claim 1, characterized in that the first securement means comprise a plurality of resilient lugs (28) disposed projecting about the external periphery of the member forming a skirt (20) and adapted to engage snap-fittingly, respectively, in a plurality of notches (30) provided on the internal surface (3a) of the side wall (3) of the body (1), whilst the second securement means comprise a plurality of resilient hooks (32) which are formed at the upper ends of vertical tongues (34) disposed on the closure cover (24) and which are adapted to be inserted snap-fittingly, respectively, into a plurality of recesses (37) provided in the member forming a skirt (20).

3. Electric kettle according to claim 1, characterized in that the closure cover (24) is also secured to the internal surface (3a) of the side wall (3) of the body (1) by third reversible securement means (43, 46) adapted to counter lock the member forming a skirt (20).

4. Electric kettle according to claim 2, characterized in that the third securement means comprise a plurality of vertical ribs (43) formed on the peripheral edge (44) of the closure cover (24) and adapted to be pressed respectively against a plurality of descending tongues (46) each formed from a corresponding notch (30) for securement of the member forming a skirt (20) which is provided on the internal surface (3a) of the side wall (3) of the body.

5. Electric kettle according to claim 1, characterized in that the peripheral edge of the heating plate (8) is constituted by a horizontal wing (8a) which is connected to the plate (8) by another wing forming a bend (8b), said horizontal wing (8a) extending to a level higher than that of the plate (8) and resting on the upper peripheral edge (22) of the member forming a skirt (20).

6. Electric kettle according to claim 5, characterized in that the bend (8b) has a transverse cross-section of inverted U shape which is slightly flared and whose base is rounded.

7. Electric kettle according to claim 5, characterized in that the side wall (3) of the body (1) comprises a wing (50) which extends horizontally inwardly of the reservoir (10) by being disposed slightly above the bend (8b) of the heating plate (8), and which has an edge (50a) descending in line with the horizontal wing (8a) of the plate (8), a sealing joint (52) being disposed between said edge (50a) and the bend (8b) of the plate and having a peripheral edge (52a) which is gripped between said edge (50a) and the horizontal wing (8a) of the plate (8).

8. Electric kettle according to claim 7, characterized in that the sealing joint (52) is molded of a flexible plastic material, such as an elastomer of the silicone type.

9. Electric kettle according to claim 1, characterized in that the electrical resistance (6) is adapted to produce a high heating power, of the order of 3000 watts.

10. Electric kettle according to claim 1, characterized in that the body (1) is made of a plastic material of limited thermal resistance.

* * * * *